US008892239B2

(12) United States Patent
Weber

(10) Patent No.: US 8,892,239 B2

(45) Date of Patent: Nov. 18, 2014

(54) METHOD FOR SLICING FOODSTUFFS

(75) Inventor: Günther Weber, Gross Nemerow (DE)

(73) Assignee: Weber Maschinenbau GmbH Breidenbach, Breidenbach (DE)

( * ) Notice: Subject to any disclaimer, the term of this patent is extended or adjusted under 35 U.S.C. 154(b) by 395 days.

(21) Appl. No.: 13/249,720

(22) Filed: Sep. 30, 2011

(65) Prior Publication Data

US 2012/0089244 A1 Apr. 12, 2012

(30) Foreign Application Priority Data

Oct. 6, 2010 (DE) ......................... 10 2010 047 623

(51) Int. Cl.

| | |
|---|---|
| ***G06F 19/00*** | (2011.01) |
| ***G01B 7/02*** | (2006.01) |
| ***G01B 5/02*** | (2006.01) |
| ***G01B 11/02*** | (2006.01) |
| ***G01B 13/02*** | (2006.01) |
| ***G01G 7/00*** | (2006.01) |
| ***G01G 9/00*** | (2006.01) |
| ***G01G 11/00*** | (2006.01) |
| ***G01G 17/00*** | (2006.01) |
| ***G01G 19/00*** | (2006.01) |
| ***A23L 1/317*** | (2006.01) |
| ***B26D 7/06*** | (2006.01) |
| ***B26D 7/28*** | (2006.01) |
| ***B26D 5/34*** | (2006.01) |
| ***B26D 7/30*** | (2006.01) |
| ***B26D 5/32*** | (2006.01) |
| ***B26D 5/00*** | (2006.01) |
| *B23Q 15/00* | (2006.01) |
| *B26D 5/20* | (2006.01) |
| *B26D 7/01* | (2006.01) |
| *B26D 1/29* | (2006.01) |
| *B26D 1/143* | (2006.01) |

(52) U.S. Cl.

CPC .......... *B26D 5/007* (2013.01); *B26D 2007/011* (2013.01); *B26D 7/28* (2013.01); *B26D 7/0683* (2013.01); *B26D 7/0608* (2013.01); *B26D 5/34* (2013.01); *B26D 7/30* (2013.01); *B26D 2210/02* (2013.01); *B26D 5/32* (2013.01); *B26D 1/29* (2013.01); *B26D 1/143* (2013.01); *Y10S 83/932* (2013.01)

USPC ........... 700/171; 700/103; 700/105; 700/109; 700/114; 702/155; 702/170; 702/173; 99/537; 426/518; 83/27; 83/73; 83/75.5; 83/76.8; 83/77; 83/80; 83/367; 83/932

(58) Field of Classification Search

CPC ............ B26D 5/00; B26D 5/30; B26D 5/007; B26D 5/08; B26D 5/34; B26D 7/30; B26D 7/00; B26D 7/0625; B26D 7/0683; B26D 7/28; B26D 7/32; A22C 25/18; G01G 19/382; G01G 19/414; G01G 19/42; G01G 23/32

USPC ............. 700/95, 97, 103, 105, 108, 109, 111, 700/114, 117, 159, 160, 171; 702/155, 702/170–173, 175, 176; 83/23, 27, 83/72–75.5, 76.1, 76.6–76.8, 77, 360, 83/363–365, 367, 369–371, 276–278, 929, 83/932; 99/485, 537; 426/518

See application file for complete search history.

(56) References Cited

U.S. PATENT DOCUMENTS 4,532,840 A * 8/1985 Antonissen .................... 83/76.8
4,794,996 A * 1/1989 Wallace et al. ............ 177/25.14

(Continued)

*Primary Examiner* — Crystal J Barnes-Bullock

(74) *Attorney, Agent, or Firm* — Rader, Fishman & Grauer PLLC

(57) ABSTRACT

The disclosure describes a method for cutting a food product into slices for producing portions by taking into account the target weight thereof. Information about a remainder of the food product to be sliced is used to control corresponding actuators for a successive food product to be sliced.

19 Claims, 1 Drawing Sheet

(56) References Cited

U.S. PATENT DOCUMENTS

| | | | | |
|---|---|---|---|---|
| 5,109,936 | A * | 5/1992 | Ruppel | 177/25.19 |
| 6,701,279 | B1 * | 3/2004 | Hawes | 702/155 |
| 7,055,419 | B2 * | 6/2006 | Sandberg | 83/75.5 |
| 8,336,434 | B2 * | 12/2012 | Sandberg et al. | 83/364 |
| 2007/0196540 | A1 * | 8/2007 | Kirksey et al. | 426/94 |
| 2011/0226101 | A1 * | 9/2011 | Volkl | 83/19 |
| 2012/0198975 | A1 * | 8/2012 | Lindee | 83/23 |

* cited by examiner

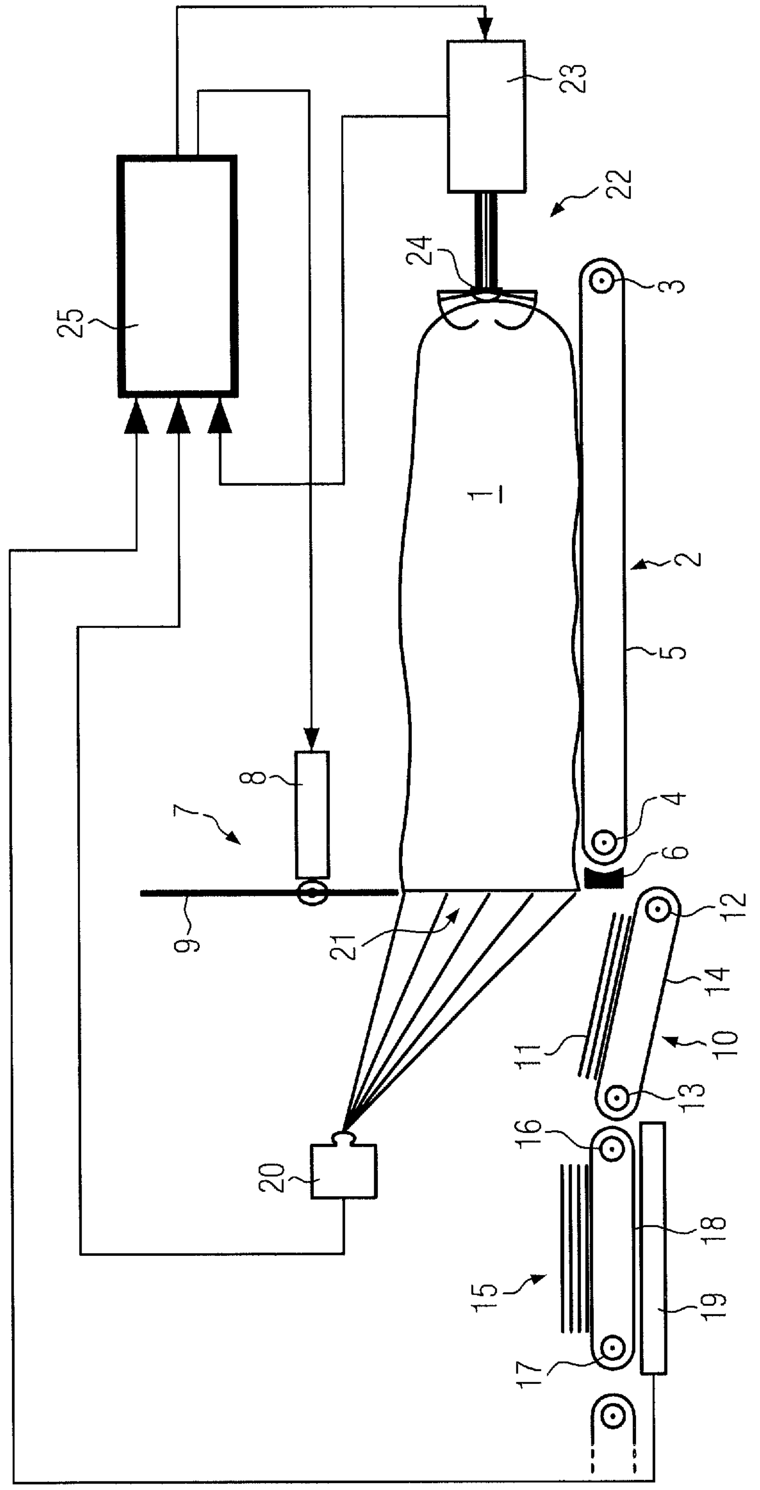
23
22
24
25
3
1
2
5
8
7
4
6
9
21
12
14
11
10
13
16
20
18
15
19
17

METHOD FOR SLICING FOODSTUFFS

CROSS-REFERENCE TO RELATED APPLICATIONS

This application claims priority based on German Application No. 102010047623.4, filed Oct. 6, 2010, which is hereby incorporated by reference in its entirety.

TECHNICAL FIELD

The disclosure relates to a method for cutting a food product into slices for producing portions.

BACKGROUND

In practice there are methods for slicing food products, e.g. sausage or cheese, wherein the products are cut into slices in order to be removed from a slicing area, for instance, in the form of shingled portions or stacked portions. Subsequently, the portions are packaged and delivered to supermarkets, which offer the portioned food product to their customers for consumption.

According to the law the packaged food product has to comply with a predetermined target weight, but at least has to be within a tolerance range.

Modern cutting devices allow the control of various parameters in order to obtain a desired slice cutting thickness during the production, which results in a target-weighted portion. In practice it is usually the case, however, that a food product fed to the cutting device is not completely cut up so that a remainder is left over. Such a remainder which could have been cut up as well, but does not make a portion with the target weight, reduces the yield.

Taking into account the aforementioned problem with respect to the remainder methods are these days used in practice which evaluate data about the geometry of the food product to be sliced before this food product is sliced, so as to partition the food product to be sliced into target-weighted portions in such a way that only a small remainder is left over.

The generic DE 101 31 701 A1 relates to a method for slicing food products that have a non-uniform inner structure, e.g. sausage or cheese, wherein the products are cut into slices, and particularly shingled portions or stacked portions are formed and removed from the slicing area. During the slicing, information about the contour and the structure of the product slices are obtained in successive detection processes by means of an optoelectric detection apparatus.

The information can be evaluated subsequently and be combined to obtain an overall information about both the contour and the structure of the product slices. Then, based on the obtained data about the contour and structure, certain operating parameters of the slicing machine, e.g. the thickness of the slices, can be varied during the slicing process, e.g. by controlling corresponding actuators, for instance, in order to keep the weight of slice portions to be formed by the cut slices constant within predefined limits. Although portions having the target weight can thus be reliably cut, the optoelectric detection apparatus is unable to prevent that a remainder is left over when the food product is sliced.

SUMMARY

The disclosure provides an improved method, which may be used to minimize a remainder when slicing a food product into target-weighted portions, that is, a still sliceable piece which is not enough, however, to form a target-weighted portion, and to improve a device with simple constructive means such that it minimizes a remainder when cutting successive food products.

As was mentioned before, optical systems are used in practice, by means of which the outer contour of a product can be determined so that slices having a desired target weight can be obtained. For instance, a camera detects the part of a food product to be cut and, based on the cut surface, detects the geometry of the following slice to be cut off. The necessary thickness of the slice to be cut off can be obtained by controlling corresponding actuators. Thus, portions can be cut which correspond to a desired target weight, whilst having at least a weight within a tolerance. Also, cutting plans are used for slicing the food product in order to avoid a possible remainder.

It has shown in practice, however, that during the slicing of foodstuffs remainders are usually left over, i.e. a left over piece which could still have been cut up, but is not enough to make a portion with a target weight. Therefore, according to the invention, an evaluation is performed whether slicing the product in an ideal manner has been successful. If the evaluation shows that a remainder is left over, this information is supplied to a control system, which will be referred to as controller below, wherein, based on the information about the remainder, the slicing of a successive food product is controlled in such a way that an enhanced yield, if possible without a remainder, can be achieved.

According to the disclosure, several food products are successively fed on a conveyor to a cutting device so as to cut the conveyed food product into slices. During the slicing, data about a cut surface of the food product to be cut are obtained by a camera. The data or information, respectively, are evaluated by a controller which is connected to the camera, so as to vary during the slicing of the food product the thickness of the slices to be cut off by controlling corresponding actuators. According to the invention the controller is configured to detect a sliceable remainder of a first food product, which is not enough to make a portion having the target weight. The detected remainder of the food product is supplied to the controller in form of an input signal and is taken into account by the controller for controlling corresponding actuators during the slicing of a successive food product in order to minimize a new remainder.

As products may be similar, such a feedback is definitely sensible. At the end of the product to be sliced it frequently happens that the product diameter, i.e. the cut surface, becomes smaller. If several food products of one kind are sliced this diameter is similar, so that it is possible by the feedback to obtain a slicing nearly without a remainder after a few sliced products.

Based on the feedback of information about a possibly present remainder the method according to the invention allows a self-learning technical effect, which serves to keep the yield-reducing remainder at a minimum. Thus, the handling efficiency can be improved.

Preferably, the controller detects the remainder by means of weight data and/or length data and/or cut surface data and/or specific weight data and evaluates the remainder for the slicing of at least the next food product. It is an advantage that all of the data are easy to obtain without causing a considerable cost expenditure.

Also, it is an advantage if the controller creates a cutting plan at least for the next food product to be sliced, on the basis of which the food product can be sliced into n portions having the target weight, if possible without a remainder, wherein the remainder of at least a preceding sliced food product is taken into account for the creation of the cutting plan. Based on the cutting plan, taking into account a remainder of a preceding sliced food product, the remainder can be minimized in a subsequent slicing process. In the best case no more remainder is left over.

In another embodiment of the invention the controller evaluates the remainder as input signal in order to determine an output signal which controls the forward feed of corresponding actuators. By controlling the forward feed of corresponding actuators the slice thickness of a slice to be cut off can be adjusted in such a way that a target-weighted portion is obtained and, at the same time, a remainder for the food product to be sliced is minimized.

Preferably, the weight of each single portion may deviate from the target weight by a given tolerance, wherein the sum of the portion weights sliced over a time period T divided by the number of the portions sliced in this time period T corresponds to the target weight. Thus, another margin for slicing the food product without a remainder is created.

For the disclosed method, there is provided a device comprising a conveyor for feeding the food product to a cutting device and a camera for detecting a cut surface of the food product. In addition, the device comprises a controller for evaluating the data of the camera, which is connected to actuators so as to vary the forward feed of the conveyor by controlling corresponding actuators. According to the invention the device for slicing several successive food products is characterized in that an input signal can be detected for the controller by evaluating a cuttable, yet not target-weighted remainder of a first food product to be sliced, in order to minimize a new remainder during the slicing of at least a successive food product.

In another embodiment of the device according to the invention the controller can detect weight data and/or length data and/or cut surface data and/or specific weight data of the food product as input signal so as to evaluate the remainder. Moreover, the controller can preferably output the remainder as output signal so as to control the forward feed of corresponding actuators for the slicing of at least a next food product. Thus, it is possible to easily control the slice thickness of the food product to be sliced in order to cut the product to be sliced into portions such that a remainder is minimized.

In order to achieve that the food product is fed to the cutting device uniformly for it to be sliced, the conveyor is preferably designed as a gripping device whose forward feed can be controlled by the controller. It should be born in mind, however, that the part of the food product gripped by the gripping device is non-cuttable and, therefore, cannot be assessed as a remainder within the meaning of the invention.

In another embodiment, a length measuring device, which is connected to the controller, is provided for detecting the length of a food product. The length measuring device allows a continuous detection of the length of the food product. Also, the length measuring device allows the detection of length data, which are used for both creating a cutting plan for the food product to be sliced and evaluating a remainder.

In another embodiment, the device comprises a scale, which is connected to the controller, for determining an actual weight of a sliced portion. Sliced portions can be measured by the scale, wherein weight data of the sliced portion are supplied to the controller so as to control corresponding actuators.

Also, it is an advantage if the camera, seen in the direction of the forward feed, is provided downstream of the cutting device. Preferably, the camera is directed towards the cut surface. This has the advantage that the camera can detect the size of the cut surface in a reliable manner.

It is a particular advantage if the controller can evaluate the data obtained by the camera for determining the thickness of the slice to be cut off during the slicing of the food product. Thus, it is achieved that the thickness of the slice to be cut off can be detected by the controller with a fast reaction in real time so as to cut off a target-weighted portion.

In one embodiment, the cutting device comprises a sickle knife or a circular knife.

Optionally, it is provided for the aforementioned length measuring device that it is disposed directly on the gripping device or at another site of the conveyor, respectively. Also, it is considered to be an advantageous embodiment of the invention that the scale is formed as a part of the conveyor.

Moreover, it may be provided that the camera is directed to the cut surface of a slice not yet completely cut off by the knife in order to supply data to the controller at an early stage. A slice thickness of the successive slice to be cut off could then be determined at an early stage so as to allow a fast-reactive control of corresponding actuators, especially a control of the forward feed.

BRIEF DESCRIPTION OF THE DRAWINGS

FIG. 1 shows an embodiment of a food slicing apparatus.

DETAILED DESCRIPTION

In FIG. 1, a food product 1 is placed on a horizontally mounted conveyor 2. The food product 1 is, for instance, a substantially cylinder-shaped sausage or a cheese handled in the shape of a cylinder. The shape of the food product 1 may vary. During the slicing of several successive food products 1 preferably a substantially uniform shape is to be handled. Usually, the food product 1 also has a constant specific weight.

The horizontally mounted conveyor 2 transports the food product 1 in the direction of the forward feed from the right to the left. Seen in the direction of the forward feed, the conveyor 2 comprises a first horizontal deflection pulley 3 as well as a second horizontally mounted deflection pulley 4. A conveyor belt 5 is mounted around the deflection pulleys 3, 4, which is made, for instance, of a hard rubber coating and may be reinforced by metal inserts. Preferably, the first deflection pulley 3, seen in the direction of the forward feed, is connected to a drive by means of which a conveying speed can be adjusted (not shown). The conveyor 2 may also be mounted in an inclined position so as to make use of the own weight of the food product 1 to be conveyed for an easier transport.

To the left of the second deflection pulley 4, seen in the direction of the forward feed, a support block 6 is provided, which supports the food product 1 from underneath. The support block 6 may be made of different materials.

A cutting device 7 is mounted above the second deflection pulley 4 of the conveyor 2 and above the support block 6, respectively. The cutting device 7 comprises a drive 8 which is connected to a knife 9. Preferably, the knife 9 is designed as a sickle knife or a circular knife, and is disposed vertically relative to the horizontally fed food product 1. If the food product 1 is transported with an inclination the drive 8 can move the knife 9 to adopt an orthogonal position, seen in the direction of the forward feed. The cutting device 7 cuts the food product fed by the conveyor 2 into slices.

Moreover, seen in the direction of the forward feed, an inclined conveyor 10 is positioned behind the conveyor 2. An already cut portion 11 is placed on the inclined conveyor 10. The inclined conveyor 10 may be adjusted to adopt different inclined positions and comprises two deflection pulleys 12,

13 around which a conveyor belt 14 is mounted. If the cutting device 7 cuts off a slice from the food product 1, this slice drops down onto the inclined conveyor 10, or the slice is thrown onto the inclined conveyor 10 by non-illustrated positioning elements. Moreover, the inclined conveyor 10 is connected to a separate drive not shown in FIG. 1. The inclined conveyor 10 can be used for an interval-like transport, wherein it is configured to transport the cut slices further portion by portion.

A horizontally mounted portion conveyor 15 is provided downstream of the inclined conveyor 10 and the cutting device 7. This portion conveyor 15 comprises two deflection pulleys 16, 17 around which a conveyor belt 18 is mounted. The portion conveyor 15 is positioned on a scale 19 which may be used to detect the weight, i.e. to detect an actual weight of a portion. Alternatively, the scale 19 may be integrated in the portion conveyor 15. In another embodiment the portion conveyor 15 is disposed directly behind the conveyor 2.

FIG. 1 also shows a camera 20 provided downstream of the cutting device 7 and positioned approximately at the height of the drive 8 of the cutting device 7. The camera 20 focuses a cut surface 21 of the food product 1 from a position that is offset upwardly at an angle relative to the cut surface 21. In another embodiment of the invention the camera 20 is disposed opposite the cut surface 21 so that the focus is directed frontally to the cut surface 21. Despite high cutting speeds of the cutting device 7 the camera 20 is configured to completely detect the cut surface 21 during the cutting process.

A gripping device 22 is shown as well, which holds a right end of the food product 1. The gripping device 22 comprises a drive 23, which may be a spindle drive. The drive 23 is connected to a gripper 24 and configured to displace the gripper 24 in the direction of the forward feed. The gripper 24 holds on to the food product 1 and positions it on the conveyor 2. A forward feed of the gripper 24 is synchronized with the forward feed of the conveyor 2. Although the gripper 24 holds on to the food product 1 with gripper tongs type fixing means in FIG. 1, other holding and positioning means not gripping into the food product may be used as well, e.g. a vacuum bell jar. As an alternative to the gripping device 22 for positioning the food product it would also be possible to dispose fixing means directly at the conveyor belt 5 of the conveyor 2. Conceivable are, for instance, positioning bars ensuring that the food product 1 is fed uniformly to the cutting device 7.

FIG. 1 further shows a controller 25. The controller 25 is configured as a control system and is connected to the drive of the conveyor, to the drive 8 of the cutting device 7, to the drive of the inclined conveyor 10, to the drive 23 of the gripping device 22 as well as to the scale 19 and the camera 20. The controller 25 is configured to obtain data of the actuators which are connected to the controller 25, as well as data of the camera 20 and of the scale 19 while a first food product 1 is sliced, to evaluate these data and take them into account for controlling the connected actuators during the slicing of at least a successive food product 1. Specifically, the controller 25 is configured to detect a cuttable remainder, which does not reach a predetermined target weight for a portion, however. The remainder is evaluated by the controller 25 on the basis of the detected data and the specific weight of the food product 1 and can be taken into account, for instance, for the forward feed control during the slicing of a successive product 1, so that a new remainder is minimized or, in the best case, no longer exists.

The food product 1 is fed by the conveyor 2 or the gripping device 22 to the cutting device 7 until the controller 25 receives information that show a remainder, that is, a cuttable part insufficient, however, to cut off a target-weighted portion therefrom. The controller 25 uses the information about the remainder for slicing at least a successive food product 1 by controlling corresponding actuators and, if applicable, the information are used for creating a cutting plan as a result of which a minimized remainder of a successive food product 1 can be expected.

The invention claimed is:

1. A method for cutting a food product into slices for producing portions by taking into account the target weight thereof, wherein several food products are successively fed on a conveyor to a cutting device so as to cut the conveyed food product into slices, the method comprising:

obtaining data about a cut surface of the food product to be cut during the slicing by a camera;

evaluating the data of the cut surface by a controller connected to the camera so as to vary, on the basis of the data, the thickness of the slice to be cut off during the slicing of the food product by controlling corresponding actuators;

detecting a remainder of a first food product that is insufficient to cut off a portion having the target weight therefrom, wherein the remainder is supplied as an input signal to the controller and is taken into account by the controller for controlling corresponding actuators during the cutting of at least a next food product to minimize a new remainder; and creating a cutting plan at least for the next food product to be sliced, on the basis of which the at least next food product can be sliced into a plurality of portions having the target weight, wherein the remainder of the first preceding sliced food product is taken into account for creating the cutting plan of the at least next food product, while minimizing the remainder of the at least next food product.

2. The method according to claim 1, wherein the detecting is executed by the controller using at least one of weight data, length data, cut surface data, and specific weight data.

3. The method according to claim 1, further comprising evaluating the remainder as the input signal to determine an output signal which controls the forward feed of corresponding actuators.

4. The method according to claim 1, wherein a weight of each single portion may deviate from the target weight by a given tolerance and wherein the sum of the portion weights sliced over a time period T divided by the number of the portions sliced in this time period T corresponds to the target weight.

5. A device for cutting several successive food products into slices for producing portions by taking into account the target weight thereof, comprising:

a conveyor for feeding the food product to a cutting device;

a camera for detecting a cut surface of the food product; and a controller for evaluating data of the cut surface from the camera so as to vary the forward feed of the conveyor by controlling corresponding actuators to reach the target weight, wherein an input signal can be detected for the controller by evaluating a cuttable, yet not target-weighted remainder of a first food product to be sliced, to minimize a new remainder during the slicing of at least a next food product and wherein the controller is configured to output the detected remainder of the first food product as an output signal to control the forward feed of the corresponding actuators for the slicing of the at least next food product, such that the new remainder of the next food product is minimized.

6. The device according to claim 5, wherein the controller can detect one or more of weight data, length data, cut surface data, or specific weight data of the food product as the input signal.

7. The device according to claim 5, wherein the conveyor is designed as a gripping device with a forward feed that can be controlled by the controller.

8. The device according to claim 5, wherein by a length measuring device, which is connected to the controller, for detecting the length of a food product.

9. The device according to claim 5, wherein by a scale, which is connected to the controller, for determining an actual weight of a sliced portion.

10. The device according to claim 5, wherein the camera, seen in the direction of the forward feed, is downstream of the cutting device.

11. The device according to claim 5, wherein the camera is directed towards the cut surface.

12. The device according to claim 5, wherein the controller can evaluate the data of the cut surface obtained by the camera for determining the thickness of the slice to be cut off during the slicing of the food product.

13. The device according to claim 5, wherein the cutting device comprises a sickle knife or a circular knife.

14. A device for cutting several successive food products into slices, comprising:

a conveyor configured to feed a first food product to a cutting device;

a camera configured to detect a cut surface of the first food product; and a controller configured to evaluate the data of the cut surface from the camera so as to vary the forward feed of the conveyor by controlling corresponding actuators to reach the target weight, wherein the controller is configured to detect an input signal by evaluating data obtained by the cut surface from the camera to determine a thickness of a slice to be cut off by the cutting device during the slicing of the first food product, wherein the controller is configured to output a detected remainder of the first food product as an output signal to control the forward feed of the corresponding actuators for the slicing of at least a next food product, such that a new remainder of the next food product is minimized.

15. The device according to claim 14, wherein the controller is configured to detect at least one of weight data, length data, cut surface data, and specific weight data of the food product as the input signal.

16. The device according to claim 14, wherein a length measuring device is connected to the controller and configured to detect the length of a food product.

17. The device according to claim 14, wherein a scale is connected to the controller and configured to determine an actual weight of a sliced portion.

18. The device according to claim 14, wherein the camera, relative to the direction of the forward feed, is downstream of the cutting device.

19. The device according to claim 14, wherein the camera is directed toward the cut surface.

* * * * *